United States Patent [19]

Custro et al.

[11] Patent Number: 5,284,915
[45] Date of Patent: Feb. 8, 1994

[54] STYRENE-ISOPRENE BLOCK COPOLYMERS

[75] Inventors: Sergio Custro, Ravenna; Alessandro Zazzetta, Cesena, both of Italy

[73] Assignee: Enichem Elastomeri S.p.A., Palermo, Italy

[21] Appl. No.: 873,403

[22] Filed: Apr. 24, 1992

Related U.S. Application Data

[63] Continuation of Ser. No. 674,784, Mar. 25, 1991, abandoned, which is a continuation of Ser. No. 448,886, Dec. 12, 1989, abandoned.

[30] Foreign Application Priority Data

Dec. 23, 1988 [IT] Italy ................. 23088 A/88

[51] Int. Cl.⁵ ................. G08F 257/02; G08F 279/02
[52] U.S. Cl. ................. 525/89; 525/316
[58] Field of Search ................. 525/316, 89, 316

[56] References Cited

U.S. PATENT DOCUMENTS

| | | | |
|---|---|---|---|
| 3,586,740 | 6/1971 | Schott et al. | 526/347 |
| 3,634,549 | 1/1972 | Shaw et al. | 525/314 |
| 3,853,978 | 12/1974 | Horiie et al. | 526/547 |
| 4,086,298 | 4/1978 | Fahrbach et al. | 525/316 |
| 4,335,221 | 1/1982 | Gerberding | 525/316 |
| 4,377,665 | 3/1983 | Shiraki et al. | 525/316 |

*Primary Examiner*—Bernard Lipman
*Assistant Examiner*—Tom Weber
*Attorney, Agent, or Firm*—Hedman, Gibson & Costigan

[57] ABSTRACT

New polymeric compositions comprising:
(a) a linear copolymer constituted by four alternating blocks, which can be represented by the formula (I) or (II)

$$B_1-T-A_1-B_2-A_2 \quad (I)$$

or $$B_1-A_1-B_2-T-A_2 \quad (II)$$

wherein:
$B_1$ and $B_2$ are polydienic blocks, preferably polybutadienic blocks;
$A_1$ and $A_2$ are polyvinylaromatic blocks and preferably polystyrenic blocks;
T is a portion of random copolymer formed by dienic and vinylaromatic monomer units;
(b) a linear copolymer constituted by two blocks, which can be represented by the formulae (III) or (IV)

$$B_3-T-A_3 \quad (III)$$

or $$B_3-A_3 \quad (IV)$$

wherein:
$B_3$ is a polydienic block;
$A_3$ is a polyvinylaromatic block; and
T has the above seen meaning.

The polymeric composition, which can be blended with polystyrene, can be obtained both by blending the individual components, and by means of novel and original synthesis processes which make it possible both (A) and (B) components to be obtained simultaneously.

The polymeric compositions according to the instant invention are suitable for all of those uses in which characteristics of impact strength, transparence and processability are required.

2 Claims, No Drawings

STYRENE-ISOPRENE BLOCK COPOLYMERS

This is a continuation of application Ser. No. 07/674,784, filed Mar. 25, 1991, now abandoned, which is a continuation of application Ser. No. 07/448,886, filed Dec. 12, 1989, now abandoned.

The present invention relates to polymeric compositions comprising:
a linear copolymer constituted by four alternating blocks which can be represented by the formula (I) or (II):

$$B_1-T-A_1-B_2-A_2 \quad (I)$$

or $$B_1-A_1-B_2-T-A_2 \quad (II)$$

wherein $A_1$, $A_2$, $B_1$, $B_2$ and T respectively are 2 vinylaromatic blocks, 2 dienic blocks and a portion of random copolymer formed by dienic and vinylaromatic monomer units; and
a copolymer constituted by two blocks, which can be represented by the formulae (III) or (IV)

$$B_3-T-A_3 \quad (III)$$

or $$B_3-A_3 \quad (IV)$$

wherein: $A_3$ is a polyvinylaromatic block different from, or equal to, $A_1$ block or $A_2$ block; $B_3$ is a polydienic block different from, or equal to, $B_1$ block or $B_2$ block, and T represents the hereinabove seen random copolymer.

Also the processes for obtaining both of the above said components of said blend simultaneously and during the same process of synthesis fall within the scope of the present invention.

The polymeric compositions are endowed with very good characteristics of impact strength and processability, combined with a high transparence, which make them suitable for all of the uses provided for the transparent, impact resistance materials.

During the past years, the block copolymers obtained from the block-copolymerization of conjugated dienic monomers with vinylaromatic monomers, such as, e.g., the block copolymers of polybutadiene and polystyrene, and the block copolymers of polyisoprene with polystyrene, have shown a particular development. Such copolymers can be used as such, i.e., in the same form as they are produced by the living anionic copolymerization, as well as after their partial or total hydrogenation.

This is the case of the linear block copolymers constituted by alternating blocks of polydienes and polyvinylarenes, with a particular structure and distribution of the individual blocks, and having a structural formula of (I) or (II) type, which show an extremely favourable balance of physical and mechanical characteristics. Such block copolymers, as well as their derivatives, are disclosed by the present Applicant in the U.S. Pat. No. 4,874,821 and in a co-pending patent application.

The blending of block copolymers both with one another, and with impact-resistant and non-impact-resistant polystyrene in order to achieve resins endowed with improved properties, is known from the prior art as well.

Compositions and/or block copolymers characterized by the use of polymeric structures suitable for all of those uses for which transparent impact-resistant polystyrene has been used in the past, or is still being used at present, are reported, e.g., in BP patent No. 1,130,770; BP patent No. 1,335,077; and U.S. Pat. No. 4,086,298.

However, the copolymers claimed in these references do not show an optimum balance of rheologic properties, impact strength and transparency.

Such a balance of properties is further modified by the possible use of polystyrene which, if, on the one hand, enhances the optical characteristics, on the other hand decreases the impact strength of the so-obtained compositions.

The drawbacks which affect the prior art are overcome by the polymeric compositions according to the instant invention, constituted by blends of the two block copolymers respectively complying with the general formulae (I) or (II) and (III) or (IV), as hereinabove seen.

In accordance therewith, and according to a first aspect thereof, the present invention relates to new polymeric compositions comprising:
(a) from 40 to 90% by weight of a block copolymer of general formula (I) or (II);
(b) from 10 to 60% by weight of a block copolymer of general formula (III) or (IV), wherein the symbols $A_1$, $A_2$, $A_3$, $B_1$, $B_2$, $B_3$ and T have the hereinabove seen meaning.

The polymeric compositions according to the present invention are characterized in that the weight average molecular weight of the four-block copolymer of formula (I) or (II) is comprised within the range of from 50,000 to 300,000 whilst the weight average molecular weight of the two-block copolymer is comprised within the range of from 20,000 to 150,000.

In the same compositions, the percentage by weight of the random block T is comprised within the range of from 5 to 50%, preferably of from 10 to 25%, as referred to the total of the two copolymers which constitute the blend.

In the same compositions, the total amount of vinylaromatic monomeric units is comprised within the range of from 60 to 90% by weight, with the balance to 100% being constituted by the dienic monomeric units.

In the above definitions, the blocks $A_1$, $A_2$, $A_3$ and $B_1$, $B_2$ and $B_3$ are practically pure blocks; i.e., they are nearly totally constituted by vinylarenic and dienic units.

In the preferred form of practical embodiment, the blocks $B_1$, $B_2$ and $B_3$ are polystyrenic blocks and T is a random styrene-butadiene copolymer.

Still in the preferred form of practical embodiment, the total content of dienic units in the polymeric composition is comprised within the range of from 20 to 30% by weight, and the weight average molecular weight of the 4-block copolymer is comprised within the range of from 100,000 to 200,000; and the weight average molecular weight of the 2-block copolymer is comprised within the range of from 40,000 to 100,000. To said compositions, another polystyrenic resin, such as, e.g., polystyrene or impact-resistance polystyrene, can be added in such an amount as not to endanger the combination of properties of the binary composition.

Polymeric compositions according to the present invention constitute a progress from the viewpoint of the properties, as compared to the block copolymer of formula (I) or (II), when considered on an individual basis.

The linear block copolymer constituted by 4 alternating blocks complying with the general formula (I) or (II) according to the present invention can be obtained by polymerization, by operating in an organic solvent to which suitable amounts are optionally added of an aliphatic or cycloaliphatic polar compound selected from among ethers or amines, at temperatures comprised within the range of from 30° C. to 150° C., and under pressures equal to, or higher than, atmospheric pressure, in the presence of said alkyl-metal or aryl-metal initiators, as customarily used in the synthesis of polymers according to the living anionic polymerization method.

Such a synthesis route is disclosed in the U.S. Pat. No. 4,874,821 relating to the disclosure of such copolymers and to the method for synthesizing them. The two-block copolymers complying with the above formulae (III) or (IV) can be synthesized, on the contrary, according to methods as known from the prior art, as well as by means of the same process of synthesis as disclosed in the above said patent application, with the reaction being limited to the first step. More particularly, for the synthesis of the copolymers of formula (III), metered amounts of butadiene and styrene are fed to a reactor as a mixture with one another, and the polymerization is carried out in a solution in a hydrocarbon, with a suitable initiator for the living anionic polymerization, until monomer conversion is complete or substantially complete; in this way, a living two-block copolymer $$B_3-T-A_3$$

is formed, which is constituted by non-pure blocks, i.e., by blocks linked to each other by a copolymeric portion of chain, constituted by randomly linked monomeric units of butadiene and styrene.

The polymer formed is recovered after the preliminary quenching of the living active centres, by feeding a compound having an acidic character.

The recovery of the polymeric material is carried out according to the customary methods, such as, e.g., by steam evaporating the solvent and drying the polymer.

The copolymer of formula (IV) is obtained by anionic polymerization, with the sequential addition of the monomers according to the prior art.

The constituents of the polymeric compositions according to the instant invention can be blended and compounded according to the modalities and routes as well-known from the prior art. So, e.g., the ingredients can be blended in the molten state and extruded or mixed in Banbury type mixers, or they can be blended as solutions. The present Applicant has also developed—and they constitute a further purpose of the present invention—novel and original processes which make it possible the 2 components to be produced simultaneously and by means of one single synthesis process.

According to one of such processes, the synthesis is carried out according to the following steps:

(1) a first step during which a mixture is copolymerized in the presence of initiators, until the conversion of the monomers is nearly complete, which mixture is composed by a vinylaromatic monomer and a conjugated dienic monomer in an apolar solvent selected from among the solvents in which polystyrene having a weight average molecular weight comprised within the range of from 30,000 to 120,000 is soluble at concentrations of from 5 to 20% by weight. The initiators are alkyl-lithium compounds in order to originate a living polymeric system. The solvent system can contain polar compounds (such as ethers, amines, and so forth), at a maximum concentration of 0.1% by weight relatively to the solvent. The percentage by weight of the monomers fed in mixture to the first reaction step according to the process of the present invention, is comprised within the range of from 30 to 60% by weight, relatively to all of the monomers fed to the reaction. During the above disclosed reaction, a living copolymer of $$B_1-T-A_1$$

type is formed.

(2) A second step, in which a percentage of the living active centres generated during the first reaction step are quenched by means of the addition to the reaction system of compounds characterized in that they contain acidic hydrogen atoms ($H_2O$, alcohols, and so forth) in their chemical structure. The amount of active centre quenches added to the second step of such a process is comprised within the range of from 10 to 50% by mol, relatively to the moles of initiator fed to the first step.

(3) A third step, in which a conjugated diene is fed to the living system coming from the second step and undergoes a complete conversion.

(4) A fourth step in which a vinylaromatic monomer is fed and is nearly totally converted.

(5) A fifth step in which the living active centres are totally quenched by feeding a compound with an acidic reactivity.

In such a way, the blend of the two copolymers $$B_1-T-A_1-B_2-A_2+B_1-T-A_1$$

is obtained.

This process is carried out under the above indicated general conditions of temperature and pressure, i.e., at temperature values comprised within the range of from 30° C. to 150° C. and under atmospheric, or superatmospheric pressure.

One of the variants constituting alternative routes for the above said process comprises, at the end of the first step of polymerization of the mixture of monomers, a second step in which a second aliquot of initiator is fed.

Such a route leads to the formation of an additional number of active centres, on which pure block copolymers, previously described by means of the formula $$B_3-T-A_3$$

are formed.

In that case, the various sequential steps are:
(1) Synthesis of a pure dienic block;
(2) Synthesis of a pure vinylaromatic block in sequence to the dienic block;
(3) Feed of a further aliquot of initiator;
(4) Feed of a mixture constituted by a dienic monomer and a vinylaromatic monomer. The amount of monomers fed in mixture with each other is comprised within the range of from 30 to 60% relatively to all of the monomers fed to the reaction.

(5) Quenching of the living active centres by means of a compounds which contains acidic hydrogen atoms.

By means of processes analogous to those as hereinabove disclosed, two polymer blends can be respectively obtained:

or

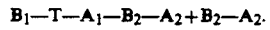

The initiators preferred for the intended purpose are those belonging to the group consisting of both linear and branched alkyl-lithium compounds, and, among them, n-butyl-lithium and sec.-butyl-lithium.

These initiators are customarily used in the various steps of the process in amounts comprised within the range of from 0.025 to 0.2 parts by weight per each 100 parts of monomer submitted to polymerization.

The solvents suitable for the intended purpose are the apolar solvents and, among them, those in which the polyvinylaromatic blocks with a weight average molecular weight comprised within the range of from 50,000 to 200,000 are soluble; among the most suitable of them cyclohexane and benzene can be cited.

Said solvents can contain polar compounds (such as ethers, amines, and so forth), whose presence also causes, besides an increase in the speed of reaction of polymerization which takes in the various steps, an increase in the weight of the random copolymeric portion T; among them, tetrahydrofuran is preferred.

The following experimental examples are illustrative and non limitative of the purview of the present invention.

EXAMPLE 1

600 g of anhydrous cyclohexane, 55 g of (99.9% pure) styrene and 13 g of (99.85% pure) butadiene are fed to a stirred reactor of 1000 cm$^3$; the temperature of the mass is increased up to 50° C., and 0.055 g of sec.-butyl-lithium (in solution in n-hexane) is fed.

25 minutes later, the reaction mass reaches the temperature of 75° C. and the conversion of the monomers is practically complete. Then, to the system 0.009 g of pure methanol and, in sequence, 7 g of butadiene are added. After 10 minutes, the reaction mass reaches the temperature of 85° C. and the conversion of butadiene is practically complete.

Finally, 25 g of styrene is added, and 15 minutes later the conversion is practically complete, with the temperature of the mass having reached the value of 90° C.

The quenching of the living active centres is carried out by adding 0.5 cc of H$_2$O to the polymeric solution.

1.0 g of triphenyl-nonyl-phosphite and 0.2 g of [pentaerythrityl-tetraalkyl-(3,5-di-tert.-butyl-4-hydroxyphenyl-propionate)] are added to the polymeric solution.

The recovery of the polymeric blend is carried out by means of the steam distillation of the reaction solvent and subsequent drying in a vacuum oven at 60° C. for 24 hours.

The physical characteristics of the two components of the polymeric blend are reported in Table No. 1. The mechanical and optical properties of specimens compression-moulded at 180° C. are summarized in Table No. 2.

TABLE NO. 1

| Example No. | Mw × 10$^{-3}$ (B$_1$TA B$_2$A$_2$) (1) | Mw × 10$^{-3}$ (B$_1$TA$_1$) (1) | Total styrene % (2) | Block styrene % (3) | MFI (4) (g/10 minutes) |
|---|---|---|---|---|---|
| 1 | 140 | 80 | 80 | 68 | 4.5 |

Analysis
GPC (1)
I.R. analysis (2)
Demolition with OsO$_4$ (3)
200° C., 5 kg (4)

TABLE NO. 2

| Transparency | % | 92 |
|---|---|---|
| Tensile strength | kg/cm$^2$ | 230 |
| Elongation at break | % | 35 |
| Modulus | kg/cm$^2$ | 8000 |
| IZOD with notch at 23° C. | kg × cm/cm | 2.5 |

EXAMPLE 2

850 g of anhydrous cyclohexane, 37.5 g of styrene and 12.5 g of butadiene are fed to a stirred reactor of 2000 cm$^3$; the temperature of the system is increased up to 55° C., and 0.040 g of n-butyl-lithium (in solution in n-hexane) is fed.

45 minutes later, the reaction mass reaches the temperature of 68° C. and the conversion of the monomers is practically complete.

Then, to the reaction solution 0.032 g of n-butyl-lithium and, in sequence, 37.5 g of butadiene are added; after 20 minutes, the reaction mass reaches the temperature of 78° C. and the conversion is practically complete.

112.5 g of styrene is then added to the polymeric solution and, 60 minutes later, the conversion of the monomer is complete.

The reaction is then quenched by adding 2 g of methanol to the solution containing the polymeric blend. The addition of the antioxidant, and the recovery and drying of the polymer are carried out in the same way as in Example 1.

The physical characteristics of the two components of the polymeric blend are reported in Table No. 3.

The mechanical and optical properties of specimens compression-moulded at 180° C. are summarized in Table No. 4.

TABLE NO. 3

| Example No. | Mw × 10$^{-3}$ (B$_1$TA$_1$B$_2$A$_2$) | Mw × 10$^{-3}$ (B$_2$A$_2$) | Total styrene % | Block styrene % | MFI (g/10 minutes) |
|---|---|---|---|---|---|
| 2 | 170 | 85 | 75 | 65 | 3.5 |

TABLE NO. 4

| Transparency | % | 86 |
|---|---|---|
| Tensile strength | kg/cm$^2$ | 165 |
| Elongation at break | % | 100 |
| Modulus | kg/cm$^2$ | 7,000 |
| IZOD with notch at 23° C. | kg × cm/cm | 3.2 |

EXAMPLE 3

1.2 kg of cyclohexane, 0.3 g of tetrahydrofuran, 100 g of styrene and 45 g of butadiene are fed to a reactor of 1.5 liters of capacity; the temperature of the mass is increased up to 50° C., and 0.12 g of n-butyl-lithium (in solution in n-hexane) is fed.

30 minutes later, the reaction mass reaches the temperature of 80° C. and the conversion of the monomers is practically complete.

Then, 0.012 g of $H_2O$ and, in sequence, 15 g of butadiene are added to the system.

10 minutes later, the reaction mass reaches the temperature of 90° C. and the conversion of butadiene is complete.

Finally, 40 g of styrene is added and after 15 minutes of reaction the conversion is complete.

Before recovering the solid polymer, the living active centres are quenched by adding 2 g of isopropyl alcohol to the system.

After the addition of antioxidant as in Example 1, the recovery of the solid polymer is carried out by steam distillation of the solvent, and subsequent drying of the solid residue at 65° C. for 24 hours.

TABLE NO. 5

| Example No. | styrene % | Block styrene % | Mw × 10$^{-3}$ ($B_1TA_1B_2A_2$) | Mw × 10$^{-3}$ ($B_1TA_2$) | MFI (g/10 minutes) |
|---|---|---|---|---|---|
| 3 | 70 | 50 | 130 | 80 | 8.5 |

EXAMPLE 4

5 kg of the blend disclosed in Example 3 is mixed with 5 kg of commercial crystal polystyrene [Mw(GPc)=250×10$^3$]. Said mass is fed to a twin-screw extruder equipped with a heated jacket. This operation is repeated twice in order to enable the optimal mixing to be obtained; the material is then transformed into granules of 0.5 cm of length.

The properties of the so prepared compound are determined on specimens compression-moulded at 180° C. and are reported in Table No. 6.

TABLE NO. 6

| MFI | g/10 minutes | 8.2 |
|---|---|---|
| Transparency | % | 90 |
| Tensile strength | kg/cm$^2$ | 185 |
| Elongation at break | % | 100 |
| Modulus | kg/cm$^2$ | 12,000 |
| IZOD with notch | kg × cm/cm | 3.5 |

EXAMPLE 5

600 g of anhydrous cyclohexane and 30 g of (99.84% pure) butadiene are fed to a reactor of 1 liter of capacity; the mass is heated up to 60° C., and 0.09 g of sec.-butyl-lithium is added.

20 minutes later, the polymerization of butadiene is complete and the reaction temperature is of about 60° C.

70 g of (99.9% pure) styrene is then added to the system, and the reaction is complete within a time of 20 minutes; during said time period, the reaction mass reaches the temperature of 82° C.

To the reaction mass 0.058 g of initiator (n-butyl-lithium) and, in sequence, a reaction mixture composed by 70 g of styrene and 30 g of butadiene are added.

The reaction takes place within a 25-minutes time and the end reaction temperature is of 102° C.

At the end of the process, 3 g of methyl alcohol is added to the system in order to quench the active centres.

To the polymeric solution 0.8 g of TNPP (triphenyl-nonyl-phosphite) and 0,15 g of pentaerythrityltetraalkyl-(3,5-di-tert.-butyl-4-hydroxyphenyl)propionate are added to the polymeric solution.

The polymer is recovered by means of the steam distillation of the solvent, and the recovered polymer is subsequently dried in a vacuum-oven at 60° C. for 36 hours.

The physical-chemical characteristics and the mechanical characteristics of the polymeric blend are reported in Tables No. 7 and 8.

TABLE NO. 7

| Example No. | Total styrene % | Block styrene % | Mw × 10$^{-3}$ ($B_1A_1B_2TA_2$) | Mw × 10$^{-3}$ ($B_1TA_2$) | MFI (g/10 minutes) |
|---|---|---|---|---|---|
| 5 | 70 | 56 | 125 | 75 | 10 |

TABLE NO. 8

| Transparency | % | 85 |
|---|---|---|
| Elongation at break | % | 125 |
| Tensile strength | kg/cm$^2$ | 1.10 |
| Modulus | kg/cm$^2$ | 6,800 |
| IZOD with notch at 23° C. | kg × cm/cm | 5.0 |

We claim:

1. Polymeric composition comprising:
   (a) from 40% to 90% by weight of a linear block copolymer having four alternating blocks, which is represented by the formula $B_1$—$A_1$—$B_2$—T—$A_2$, wherein:
   $A_1$ and $A_2$ are polystyrene blocks;
   $B_1$ and $B_2$ are polyisoprene blocks;
   T is a copolymeric chain portion formed by random isoprene and styrene units, and
   (b) from 10% to 60% by weight of a linear block copolymer, which is represented by the formula $B_3$—$A_3$, wherein:
   $A_3$ is a polystyrene block, and
   $B_3$ is a isoprene block wherein said linear block copolymer having four alternating blocks has a weight average molecular weight of from 50,000 to 300,000 and said linear block copolymer has a weight average molecular weight of 20,000 to 150,000 and the total amount of polystyrene units being from 60 to 90% by weight of the composition and the balance to 100% of said composition being isoprene units.

2. A polymeric composition according to claim 1 which is produced from a process comprising:
   (a) a first step wherein metered amounts of isoprene are polymerized by living anionic polymerization, up to complete, or nearly complete, monomer conversion;
   (b) a second step wherein a metered amount of a styrene monomer is added to the reaction mass coming from the first step and is polymerized until the conversion of the styrene monomer is complete or substantially complete;
   (c) a third step wherein the partial quenching is carried out with a percentage comprised within the range of from 10 to 60% of the active centres produced in the previous steps by means of the addition of compounds containing acidic hydrogen atoms;
   (d) a fourth step wherein a mixture constituted by metered amounts of isoprene and of styrene monomer is fed, and the polymerization is continued until the conversion of said monomers is complete, or nearly complete; and (e) the produced blend of polymer coming from the fourth step is recovered after the preliminary quenching of the living active centres by means of a compound which contains acidic hydrogen atoms, in that way the polymeric blend constituted by the polymers $B_1-A_1-B_2-T-A_2+B_1-A_1$ being obtained.

* * * * *